United States Patent
Yamamura (10) Patent No.: US 7,136,755 B2
(45) Date of Patent: Nov. 14, 2006

(54) DRIVING ASSIST SYSTEM FOR VEHICLE (75) Inventor: Tomohiro Yamamura, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 370 days.

(21) Appl. No.: 10/859,360

(22) Filed: Jun. 3, 2004

(65) Prior Publication Data

US 2004/0249550 A1 Dec. 9, 2004

(30) Foreign Application Priority Data

Jun. 4, 2003 (JP) ............................. 2003-159296

(51) Int. Cl.
G06F 19/00 (2006.01)
(52) U.S. Cl. ........................ 701/301; 701/96; 340/435; 340/436; 340/903; 342/455
(58) Field of Classification Search ................ 701/70, 701/96, 300, 301; 342/455; 340/435, 436, 340/903
See application file for complete search history.

(56) References Cited

U.S. PATENT DOCUMENTS

| | | | |
|---|---|---|---|
| 4,628,317 A | | 12/1986 | Nishikawa et al. |
| 5,332,057 A | * | 7/1994 | Butsuen et al. ............. 180/169 |
| 5,680,097 A | * | 10/1997 | Uemura et al. ............. 340/435 |
| 6,275,773 B1 | | 8/2001 | Lemelson et al. |
| 6,317,693 B1 | * | 11/2001 | Kodaka et al. ............. 701/301 |
| 6,604,042 B1 | * | 8/2003 | Maruko et al. ............. 701/96 |
| 6,832,157 B1 | | 12/2004 | Egami |
| 6,873,911 B1 | | 3/2005 | Nishira et al. |
| 6,882,915 B1 | * | 4/2005 | Yamamura et al. .......... 701/45 |
| 6,917,872 B1 | * | 7/2005 | Egami ........................ 701/96 |
| 6,982,647 B1 | * | 1/2006 | Kuge et al. ................. 340/576 |
| 7,006,917 B1 | * | 2/2006 | Hijikata ..................... 701/301 |
| 2003/0163240 A1 | | 8/2003 | Egami |
| 2004/0059482 A1 | | 3/2004 | Hijikata |
| 2004/0172185 A1 | | 9/2004 | Yamamura et al. |
| 2004/0249549 A1 | | 12/2004 | Kondoh et al. |
| 2005/0033517 A1 | | 2/2005 | Kondoh et al. |
| 2005/0065687 A1 | | 3/2005 | Hijikata et al. |

(Continued)

FOREIGN PATENT DOCUMENTS

DE 196 20 929 A1 11/1997

(Continued)

OTHER PUBLICATIONS

Copending U.S. Appl. No. 10/682,959, filed Oct. 14, 2003, S. Hijakata.

(Continued)

Primary Examiner—Gary Chin
(74) Attorney, Agent, or Firm—McDermott Will & Emery LLP (57) ABSTRACT

In a vehicle driving assist system, an obstacle detection device detects an obstacle present in each of two obstacle detection directions with respect to a subject vehicle; and a TTC calculation device calculates a TTC between the subject vehicle and each of obstacles based on detection results of the obstacle detection device. A lateral reaction force control device controls a reaction force generated at a vehicle operation equipment for drive operation in a lateral direction of the subject vehicle based on a first TTC which is smaller in the TTCs calculated in the TTC calculation device; and a longitudinal reaction force control device controls a reaction force generated at a vehicle operation equipment for drive operation in a longitudinal direction based on a second TTC which is larger in the TTCs.

11 Claims, 9 Drawing Sheets

U.S. PATENT DOCUMENTS

| | | |
|---|---|---|
| 2005/0090984 A1 | 4/2005 | Kobayashi et al. |
| 2006/0116807 A1* | 6/2006 | Hijikata ................... 701/96 |

FOREIGN PATENT DOCUMENTS

| | | |
|---|---|---|
| DE | 198 21 163 A1 | 11/1999 |
| JP | 51-7892 B | 3/1976 |
| JP | 09-277850 | 10/1997 |
| JP | 10-166889 | 6/1998 |
| JP | 10-166890 | 6/1998 |
| JP | 10-211886 | 8/1998 |
| JP | 10-211886 | 11/1998 |
| JP | 11-348799 | 12/1999 |
| JP | 2000-215396 | 8/2000 |
| JP | 2002-323565 | 11/2002 |
| JP | 2003-063430 | 3/2003 |

OTHER PUBLICATIONS

Copending U.S. Appl. No. 10/336,802, filed Jan. 6, 2003, S. Hijakata et al.

Copending U.S. Appl. No. 10/226,232, filed Aug. 23, 2002, T. Yamamura et al.

* cited by examiner

STRAIGHT ROAD

FIG.11 B

DEVIATING FROM CURVED ROAD

SMALL YAW ANGLE

FIG.13B

LARGE YAW ANGLE

DRIVING ASSIST SYSTEM FOR VEHICLE

BACKGROUND OF THE INVENTION

1. Field of the Invention

The present invention relates to a technology for assisting driver operations, and more specifically, it relates to a driving assist system for a vehicle that assists operations performed by the driver.

2. Description of Related Art

Systems employed to assist driver operations in the related art include the system disclosed in Japanese Laid Open Patent Publication No. H10-211886. This system detects obstacles present around the vehicle and determines any latent risk potential that may exist. Then, the system inhibits a steering operation that would lead to an undesirable situation by controlling the steering assist torque based upon the calculated risk potential.

SUMMARY OF THE INVENTION

With such a vehicle driving assist system, it is wished to reliably convey the risk potential in the vehicle surroundings to the driver as a reaction force generated when a vehicle operation equipment is operated while making it possible for the driver to easily understand which obstacle is taken as a target obstacle in the reaction force control.

A vehicle driving assist system according to the present invention, comprises an obstacle detection device that detects an obstacle present in each of two obstacle detection directions with respect to a subject vehicle; a TTC calculation device that calculates a TTC between the subject vehicle and each of obstacles, that is a time to contact that expresses a length of time until the subject vehicle and the obstacle come to mutual contact, based on detection results of the obstacle detection device; a lateral reaction force control device that controls a reaction force generated at a vehicle operation equipment for drive operation in a lateral direction of the subject vehicle based on a first TTC which is smaller in the TTCs calculated in the TTC calculation device; and a longitudinal reaction force control device that controls a reaction force generated at a vehicle operation equipment for drive operation in a longitudinal direction of the subject vehicle based on a second TTC which is larger in the TTCs calculated in the TTC calculation device.

A vehicle according to the present invention, comprises a vehicle driving assist system that comprises (a) an obstacle detection device that detects an obstacle present in each of two obstacle detection directions with respect to a subject vehicle; (b) a TTC calculation device that calculates a TTC between the subject vehicle and each of obstacles, that is a time to contact that expresses a length of time until the subject vehicle and the obstacle come to mutual contact, based on detection results of the obstacle detection device; (c) a lateral reaction force control device that controls a reaction force generated at a vehicle operation equipment for drive operation in a lateral direction of the subject vehicle based on a first TTC which is smaller in the TTCs calculated in the TTC calculation device; and (d) a longitudinal reaction force control device that controls a reaction force generated at a vehicle operation equipment for drive operation in a longitudinal direction of the subject vehicle based on a second TTC which is larger in the TTCs calculated in the TTC calculation device.

A vehicle driving assist system according to the present invention, comprises an obstacle detection means for detecting an obstacle present in each of two obstacle detection directions with respect to a subject vehicle; a TTC calculation means for calculating a TTC between the subject vehicle and each of obstacles, that is a time to contact that expresses a length of time until the subject vehicle and the obstacle come to mutual contact, based on detection results of the obstacle detection means; a lateral reaction force control means for controlling a reaction force generated at a vehicle operation equipment for drive operation in a lateral direction of the subject vehicle based on a first TTC which is smaller in the TTCs calculated in the TTC calculation means; and a longitudinal reaction force control means for controlling a reaction force generated at a vehicle operation equipment for drive operation in a longitudinal direction of the subject vehicle based on a second TTC which is larger in the TTCs calculated in the TTC calculation means.

A vehicle driving assist method according to the present invention detects an obstacle present in each of two obstacle detection directions with respect to a subject vehicle; calculates a TTC between the subject vehicle and each of obstacles, that is a time to contact that expresses a length of time until the subject vehicle and the obstacle come to mutual contact, based on information of the detected obstacle; controls a reaction force generated at a vehicle operation equipment for drive operation in a lateral direction of the subject vehicle based on a first TTC which is smaller in the calculated TTCs; and controls a reaction force generated at a vehicle operation equipment for drive operation in a longitudinal direction of the subject vehicle based on a second TTC which is larger in the calculated TTCs.

DESCRIPTION OF THE PREFERRED EMBODIMENT

First Embodiment

Figure 1:
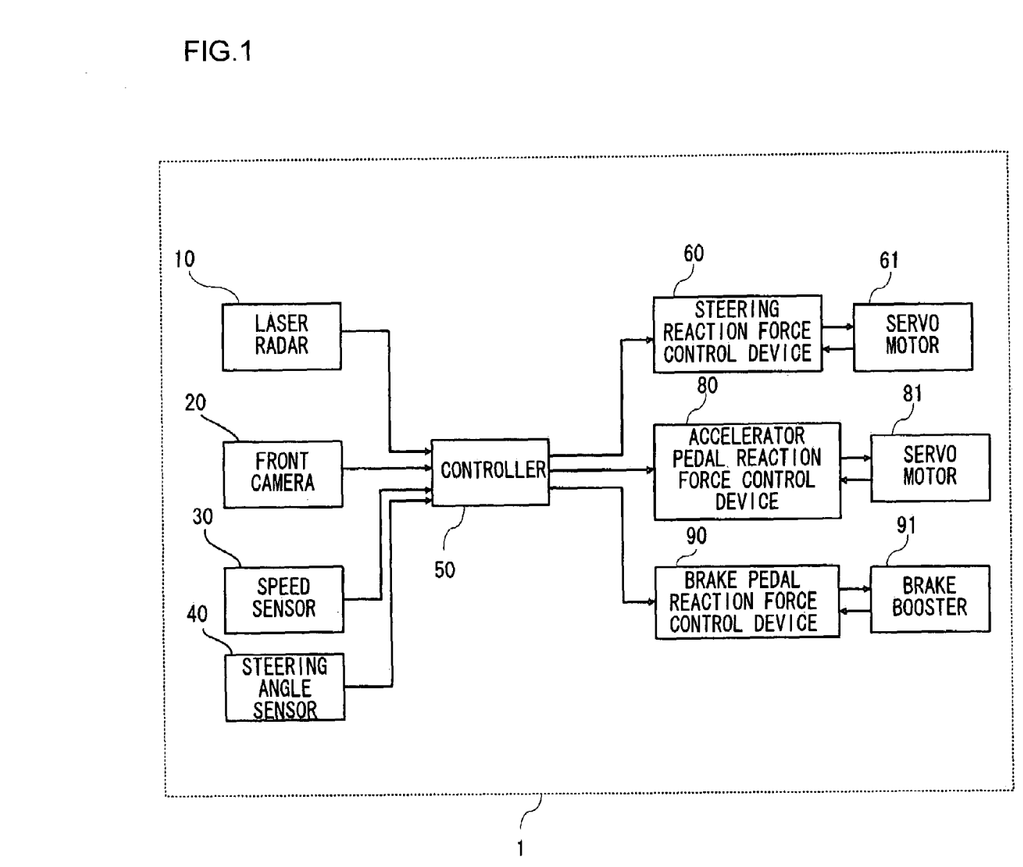
FIG. 1 is a block diagram showing the structure of a driving assist system for a vehicle according to an embodiment of the present invention.
Figure 2:
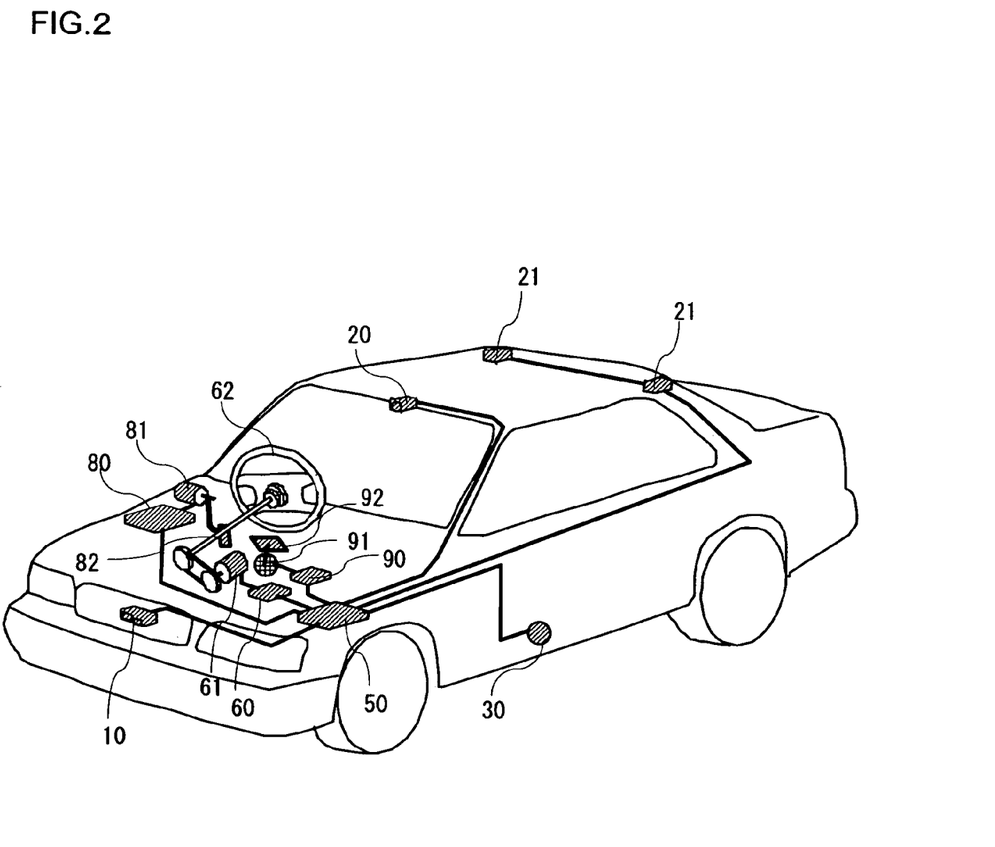
FIG. 2 is a structural diagram of a vehicle fitted with the vehicle driving assist system shown in FIG. 1.

A vehicle driving assist system according to the first embodiment of the present invention will be described referring to the drawings. FIG. 1 shows the structure of a vehicle driving assist system 1 of the first embodiment of the present invention, and FIG. 2 is a structural diagram of a vehicle fitted with the vehicle driving assist system 1.

First of all, the structure of the vehicle driving assist system will be described.

A laser radar 10 is attached to a front grill of the vehicle or to a bumper etc., and propagates infrared pulses in a forward horizontal direction for scanning. The laser radar 10 measures reflected radiation of infrared pulses reflected by a plurality of reflecting objects ahead, such as the rear of a vehicle in front, and detects a distance (inter-vehicle distance) from the subject vehicle to a preceding vehicle, a relative velocity (relative speed) of vehicles and a direction along which the preceding vehicle is present based on the elapsed time the reflected radiation to be received. The vehicle distance, relative speed and the direction thus detected are output to a controller 50. It is to be noted that the direction along which an object is present to the front of the vehicle is expressed as the relative angle to the subject vehicle.

The laser radar 10 can scan the forward region which is about 6 degrees each side of an axis parallel to the vehicle longitudinal centerline, and objects existing within this range can be detected. In addition, the laser radar 10 detects a relative distance to an obstacle such as a pedestrian who may be present forward of the vehicle and a direction along which such as obstacle exists, as well as the inter-vehicle distance and the direction of the vehicle in front.

A front camera 20 may be a compact CCD camera or CMOS camera mounted at the top of the windshield. The front camera 20 captures an image of the forward region to detect the road conditions ahead of the subject vehicle as an image and outputs the image signals to the controller 50. The detection range of the front camera 20 is approximately 30 degrees to each side of the longitudinal centerline of the subject vehicle along the horizontal direction, and the landscape of the road ahead contained in this range is taken in as an image.

A vehicle speed sensor 20 detects a traveling speed of the subject vehicle from rotational speed of a wheel thereof or rotational speed of an output shaft of a transmission and outputs the vehicle speed to the controller 50. A steering angle sensor 40 detects a steering angle of a steering wheel 62. The detected steering angle is output to the controller 50.

The controller 50 comprises a CPU and CPU peripheral devices, such as ROM, RAM etc. and executes the overall control of the driving assist system 1.

The controller 50 detects the driving environment of the subject vehicle, i.e., obstacle conditions around the subject vehicle, based upon the vehicle speed input from the vehicle speed sensor 30, the distance information input from the laser radar 10 and the image information around the subject vehicle input from the front camera 20. It is to be noted that the controller 50 detects the obstacle conditions around the subject vehicle by executing image processing on the image information provided by the front camera 20.

The obstacle conditions around the subject vehicle include the inter-vehicle distance to a preceding vehicle traveling ahead of the subject vehicle, a relative position and relative angle to a lane line (painted line) or a guardrail, such as a lateral position of the lane line with respect to the subject vehicle, and the shape of the lane line or the guardrail. Moreover, a pedestrian or motorcycle, etc. that crosses forward of the vehicle is also detected as an obstacle.

The controller 50 calculates a risk potential of the subject vehicle with respect to each obstacle based upon the detected obstacle conditions and performs controls upon the vehicle according to the risk potential thus calculated as will be described later.

A steering reaction force control device (a SF control device) 60, which is built into a steering system of the subject vehicle, controls the torque generated at a servomotor 61 in response to a command issued by the controller 50. At the servomotor 61, the torque to be generated is controlled in conformance to a command value output from the SF control device 60 and thus, the level of the steering reaction force generated when the driver operates the steering wheel 62 can be controlled as desired through the servomotor 61.

An accelerator pedal reaction force control device (an AF control device) 80 controls the torque generated at a servomotor 81 built into a link mechanism for an accelerator pedal 82 in response to a command issued by the controller 50. At the servomotor 81, the reaction force to be generated is controlled in conformance to a command value output from the AF control device 80 and thus, the level of reaction force generated when the driver operates the accelerator pedal 82 can be controlled through the servomotor 81 as desired.

When the accelerator pedal reaction force control according to the risk potential is not being performed, the accelerator pedal reaction force characteristic (normal reaction force characteristic) is set in such a manner that for instance, the accelerator pedal reaction force F increases linearly along with increase of the operation amount of the accelerator pedal 82.

The normal reaction force characteristic may be obtained, for example, by spring force of a torsion spring (not shown in the drawings) provided at the center of rotation of the servo motor 82.

A brake pedal reaction force control device (a BF control device) 90 controls a brake assist force, that is, power for assisting the driver to depress a brake pedal 92, to be generated at a brake booster 91 in response to a command issued by the controller 50. The brake booster 91 generates and controls the brake assist force in response to a command from the BF control device 90 so as to control reaction force generated when the driver depresses the brake pedal 92.

As the brake assist force becomes greater, the brake pedal reaction force becomes smaller, which makes it easier for the driver to depress the brake pedal 92. When the brake pedal reaction force control according to the risk potential is not being performed, the brake pedal reaction force may increase linearly along with increase of the depression amount of the brake pedal 92.

Next, operation of the vehicle driving assist system 1 of the first embodiment will be described. The following description summarily outlines the operation.

The controller 50 calculates the risk potential with respect to an obstacle that exists in the vehicle surroundings, for instance, painted line and a preceding vehicle running ahead of the subject vehicle. Then, based upon the calculated risk potential, the controller 50 performs reaction force controls in a longitudinal direction (back and forth direction) and a lateral direction (right-and-left direction) of the subject vehicle by controlling the accelerator pedal reaction force and the brake pedal reaction force, and the steering reaction force, respectively.

Here, a case where the risk potential is calculated for each of obstacles that exist, for instance in the range of 360-degree around the subject vehicle is considered. In this case, total risk potentials in the longitudinal direction and in the lateral direction can be calculated by respectively integrating a longitudinal component and a lateral component of the risk potential corresponding to each obstacle exists in the vehicle surroundings. Then, the reaction force controls in the longitudinal direction and the lateral direction can be performed continuously based upon reaction force control quantities according to the total risk potentials in the longitudinal direction and in the lateral direction.

However, it becomes difficult for the driver to understand which obstacle is actually taken as a target obstacle of the reaction force controls when all obstacles that exist in the range of 360-degree in the vehicle surroundings are detected and the longitudinal and lateral reaction force controls are performed based upon the risk potentials combined together for all obstacles. Moreover, the processing to calculate the total risk potentials in the longitudinal and lateral directions is complex and also it is difficult to balance the longitudinal reaction force control with the lateral reaction force control appropriately.

Given this fact, in the first embodiment, two directions (obstacle detection directions) in the forward region of the subject vehicle are set to detect obstacles, and the risk potential for an obstacle that exists on each of the obstacle detection directions is calculated. Then, by comparing the risk potentials for those two obstacles, a balance between the longitudinal reaction force control quantity and the lateral reaction force control quantity is adjusted appropriately.

Figure 3:
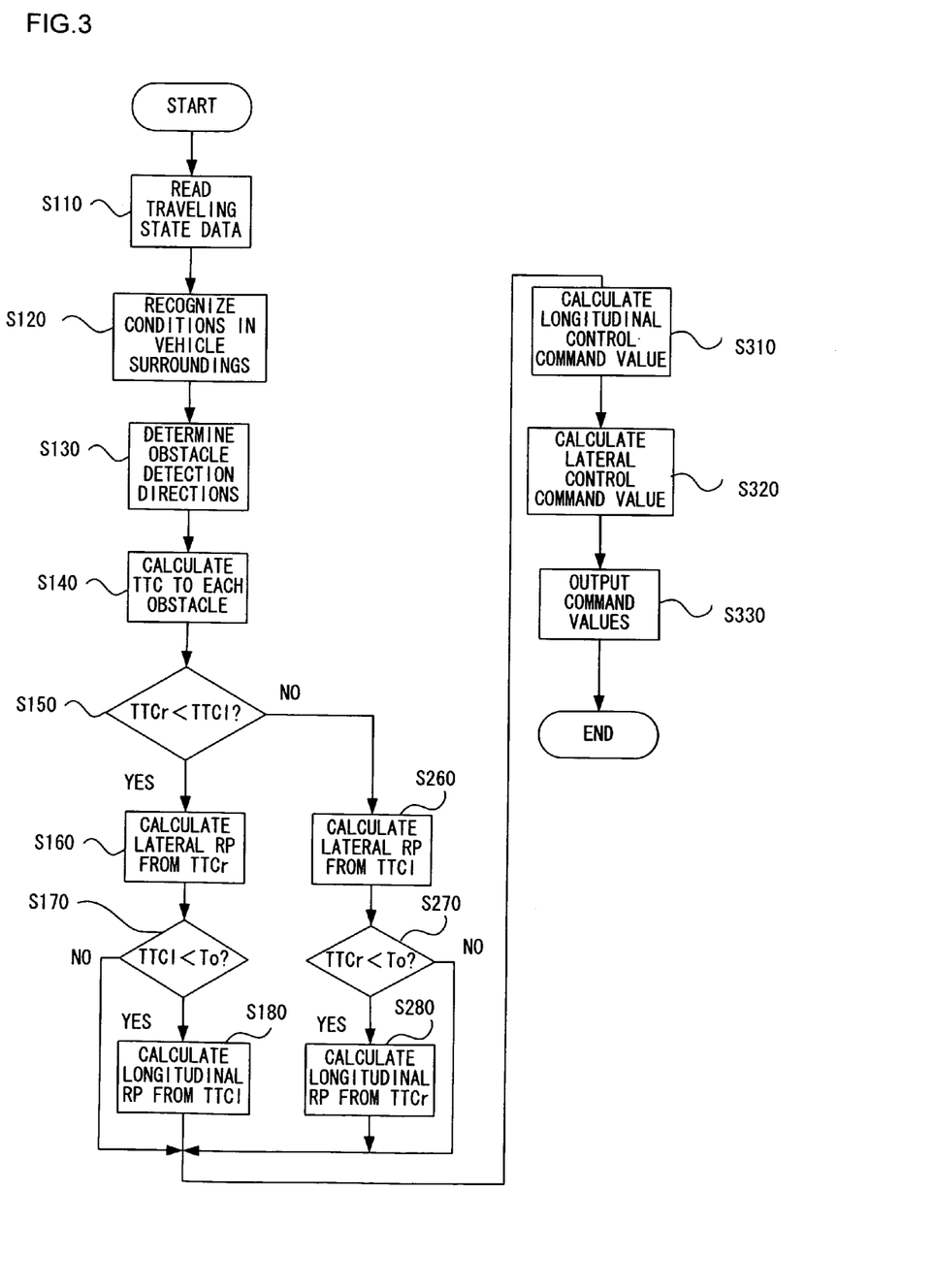
FIG. 3 is a flow chart showing the procedural flow of drive operation assist control program executed in the first embodiment.

Explanations will be given hereinafter as to how reaction force control quantities, i.e., reaction force control command values for performing the steering reaction force control, the accelerator pedal reaction force control, and the brake pedal reaction force control are determined in the first embodiment referring to FIG. 3. FIG. 3 is a flow chart showing the procedural flow of a drive operation assist control program executed in the controller 50 in the first embodiment. These processing procedures are executed continuously at predetermined time intervals of, e.g., 50 msec.

—Processing Flow in the Controller 50 (FIG. 3)—

First, driving conditions are read in in step S110. In this step, an relative distance (inter-vehicle distance) D and a relative angle to a preceding vehicle ahead of the subject vehicle detected by the laser radar 10 are read in. Positions of lane lines relative to the subject vehicle, such as a lateral position and a relative angel, the shape of the lane line, a relative distance and a relative angle to the preceding vehicle, etc., based upon the image input from the front camera 20 are also read in. In addition, a subject vehicle speed V detected by the vehicle speed sensor 30 and a steering angle STR detected by the steering angle sensor 40 are read in.

The controller 50 performs image processing upon the captured image from the front camera 20 and determines the type of the detected obstacle, in other words, whether the obstacle is a four-wheel vehicle, a two-wheel vehicle, a pedestrian or a lane line.

In step S120, a current conditions of the vehicle surroundings are recognized based on the traveling state data taken in in step S110. In concrete terms, the relative position, and the moving direction and speed of each obstacle relative to the subject vehicle at this point are recognized based on the current traveling state data obtained in step S110 and the data of relative position and moving direction and speed of each obstacle with respect to the subject vehicle that were detected in the previous cycles and stored in memory in the controller 50. Then, the position and movement relative to the subject vehicle of another vehicle or lane line that is an obstacle for the subject vehicle to travel are recognized.

Figure 4:
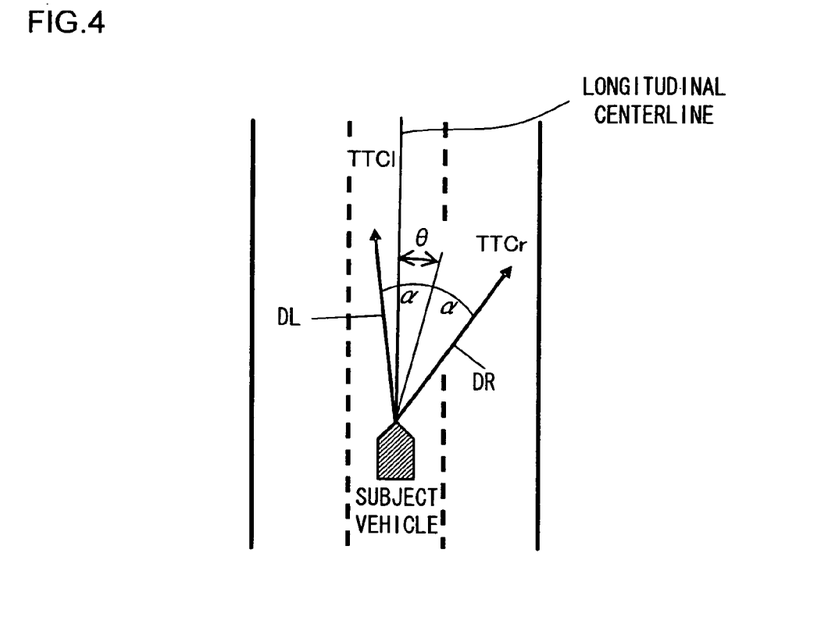
FIG. 4 is a figure showing obstacle detection directions with respect to the subject vehicle.

In step S130, the obstacle detection directions are set. In particular, a central angle θ that determines the central line between two obstacle detection directions, and an opening angle α formed between the central line and each of the obstacle detection directions, as shown in FIG. 4 are calculated. In FIG. 4, an obstacle detection direction on the right is represented by an arrow DR, and an obstacle detection direction on the left is represented by an arrow DL.

First, an approximate direction to which the subject vehicle is traveling is estimated from the subject vehicle speed V and the steering angle STR detected in step S110. The central angle θ which substantially corresponds to an angle formed between the longitudinal centerline of the subject vehicle and the traveling direction is then determined. The traveling direction of the subject vehicle is roughly in proportion to the steering angle STR and in inverse proportion to the subject vehicle speed V. Thus, the central angle θ becomes greater as the steering angle STR becomes larger, while the central angle θ becomes smaller as the subject vehicle speed V becomes greater.

Figure 5:
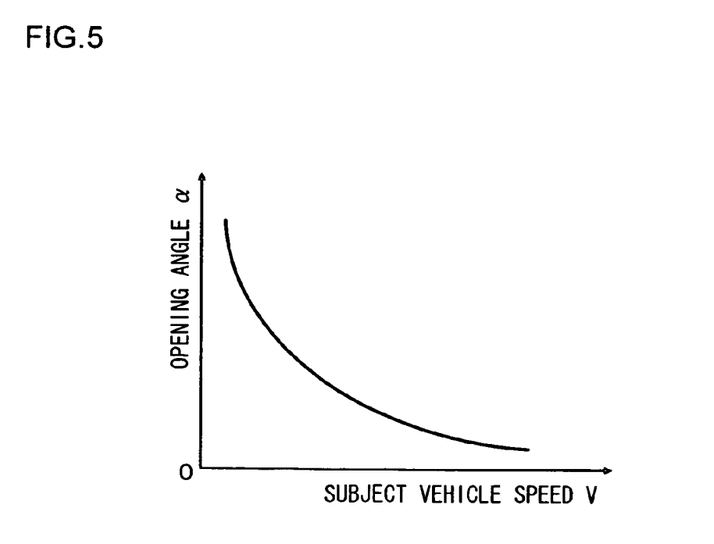
FIG. 5 shows a relationship between a subject vehicle speed and an opening angle formed between the obstacle detection directions.

The opening angle α is determined according to the subject vehicle speed V. A relationship between the subject vehicle speed V and the opening angle α is shown in FIG. 5. The opening angle α manifests a change in the traveling direction of the subject vehicle which is expected to occur when the steering angle STR changes slightly. The opening angle α is set to become smaller as the subject vehicle speed V becomes greater, as shown in FIG. 5, since a change in the traveling direction with respect to a change in the steering angle STR decreases as the subject vehicle speed V increases.

In step S140, a time to contact TTC to each obstacle that exists on the two obstacle detection directions set in step S130 is calculated respectively. The time to contact TTC(k) to each obstacle k can be calculated using the following (expression 1).

$$TTC(k)=D(k)/Vr(k) \quad \text{(expression 1)}$$

In (expression 1), D(k) is a distance from the subject vehicle to the obstacle k, and Vr(k) is a relative velocity to the obstacle k.

The time to contact TTC is a physical quantity representing current degree of closeness of the subject vehicle to an obstacle, and it expresses a length of time until the subject vehicle and the obstacle come to mutual contact. TTC is calculated by dividing the distance D between the subject vehicle and the obstacle by the relative velocity Vr. Here, a time to contact TTC(k) to an obstacle k that exists on the right obstacle detection direction shown by the arrow DR in the two obstacle detection directions is taken as a TTCr and a time to contact TTC(k) to another obstacle k that exists on the left obstacle detection direction shown by the arrow DL is taken as a TTCl.

It is to be noted when two or more obstacles exist in one obstacle detection direction, a time to contact TTC for an obstacle that is the nearest to the subject vehicle is calculated.

In step S150, values of TTCr and TTCl to the right and left obstacles calculated in step S140 are compared to each other and it is determined as to which value is smaller between the TTCr and TTCl. If the time to contact TTCr to the right obstacle is smaller than the time to contact TTCl to the left obstacle, step S160 is proceeded to.

Figure 6:
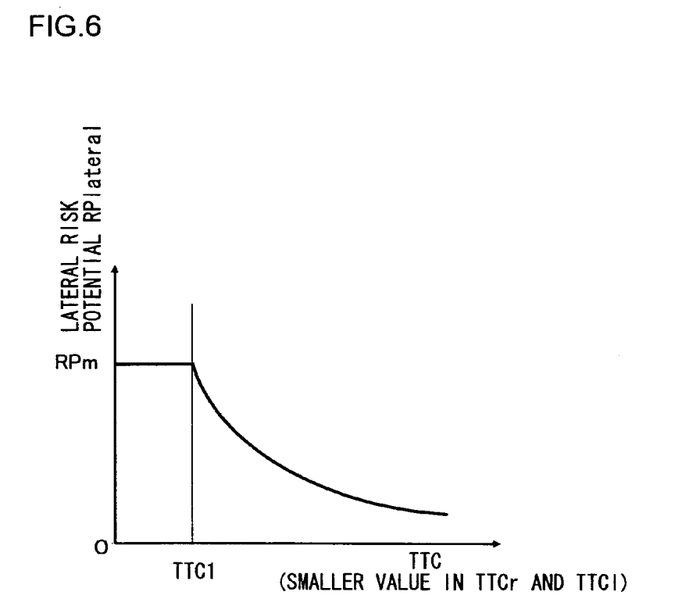
FIG. 6 is a figure showing a relationship between a time to contact which is smaller and the lateral risk potential.

In step S160, a risk potential RPlateral in a lateral direction of the subject vehicle is calculated based on the time to contact TTCr to the right which is smaller. A relationship between the time to contact TTC and the lateral risk potential RPlateral is shown in FIG. 6. As shown in FIG. 6, the lateral risk potential RPlateral increases as the time to contact TTC becomes smaller and a degree of closeness to the obstacle becomes greater. The lateral risk potential RPlateral is fixed to a predetermined value RPm when the time to contact is smaller than a predetermined value TTCl.

Next, in step S170, it is determined as to whether or not the time to contact TTCl to the left which is larger is smaller than a predetermined value T0. When the time to contact TTCl to the left is smaller than the predetermined value T0, step S180 is proceeded to.

Figure 7:
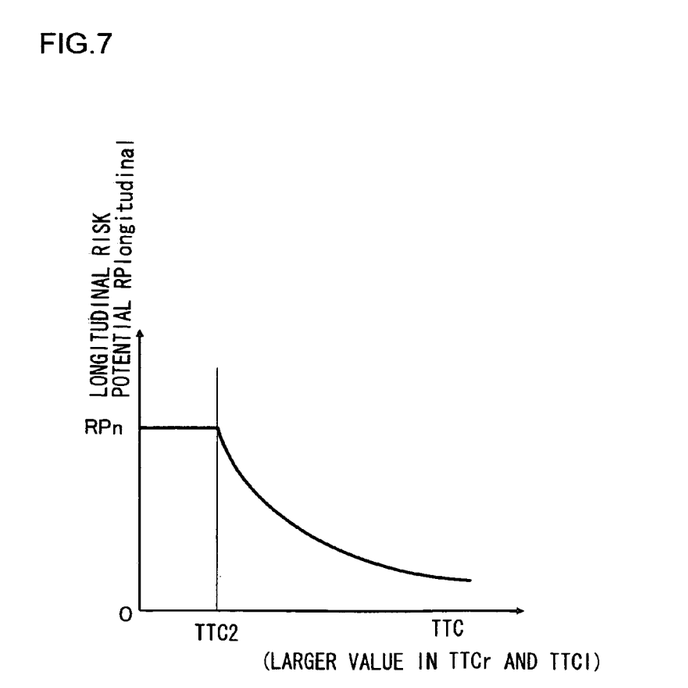
FIG. 7 is a figure showing a relationship between a time to contact which is larger and the longitudinal risk potential.

In step S180, a risk potential RPlongitudinal in a longitudinal direction of the subject vehicle is calculated based on the time to contact TTCl to the left. FIG. 7 shows a relationship between the time to contact TTC and the longitudinal risk potential RPlongitudinal. As shown in FIG. 7, the longitudinal risk potential RPlongitudinal increases as the time to contact TTC becomes smaller and a degree of closeness to the obstacle becomes greater. When the time to contact TTC is smaller than a predetermined value TTC2, the longitudinal risk potential RPlongitudinal is fixed to a predetermined value RPn.

When a negative judgment is made in step S170 in that the larger time to contact TTCl to the left is equal to or greater than the predetermined value T0, the longitudinal risk potential RPlongitudinal is not calculated. When the time to contact TTC is equal to or greater than the predetermined value T0, it can be determined that a degree of closeness to the obstacle is small enough not to perform the longitudinal reaction force control. That is, the prescribed value T0 is a threshold to determine whether a degree of closeness of the subject vehicle to the obstacle is substantial or trivial and to decide whether the longitudinal reaction force control is to be performed or not. The predetermined value T0 is set, for instance, approximately to seven seconds.

When it is determined in step S150, on the other hand, that the time to contact TTCl to the left obstacle is equal to or smaller than the time to contact TTCr to the right obstacle, step S260 is proceeded to. In step S260, the lateral risk potential RPlateral is calculated based on the smaller time to contact TTCl to the left. In this step, similarly to the processing in step S160, the lateral risk potential RPlateral is calculated in accordance with the time to contact TTCl to the left using the map shown in FIG. 6.

Next, in step S270, it is determined as to whether or not the larger time to contact TTCr to the right is smaller than the predetermine value T0. When the time to contact TTCr to the right is smaller than the predetermined value T0, step S280 is proceeded to. In step S280, the longitudinal risk potential RPlongitudinal is calculated based on the right time to contact TTCr. Here, similarly to the processing in step S180, the longitudinal risk potential RPlongitudinal is calculated in accordance with the time to contact TTCr to the right using the map shown in FIG. 7.

If a negative judgment is made in step S270 in that the larger time to contact TTCr to the right is equal to or greater than the predetermined value T0, the longitudinal risk potential RPlongitudinal is not calculated so as not to perform the longitudinal reaction force control.

In step S310, longitudinal control command values, i.e., a reaction force control command value FA to be output to the AF control device 80 and a reaction force control command value FB to be output to the BF control device 90 are calculated based upon the longitudinal risk potential RPlongitudinal calculated in step S180 or S280. The reaction forces generated at the accelerator pedal 82 and at the brake pedal 92 are controlled respectively in accordance with the longitudinal risk potential RPlongitudinal in such a manner that the accelerator pedal 82 is returned and the brake pedal 92 is depressed easily as the RPlongitudinal increases. By doing this, the driver is prompted to switch over from the operation of the accelerator pedal 82 to the operation of the brake pedal 92.

Figure 8:
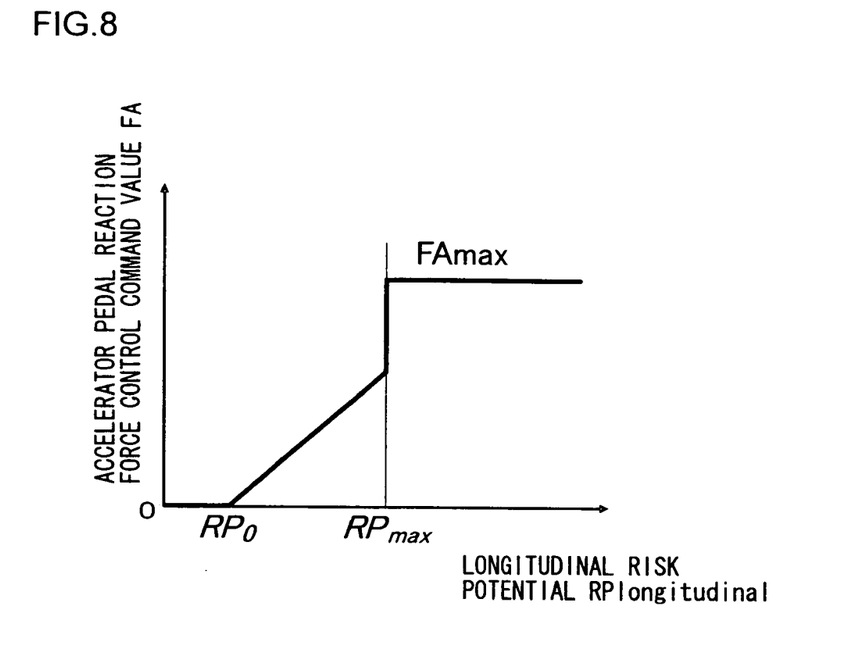
FIG. 8 is a figure showing the characteristic of the accelerator pedal reaction force command value with respect to the longitudinal risk potential.

FIG. 8 shows a relationship between the longitudinal risk potential RPlongitudinal and the accelerator pedal reaction force control command value FA. The accelerator pedal reaction force control command value FA increases so as to increase the accelerator pedal reaction force as the longitudinal risk potential RPlongitudinal becomes greater, as shown in FIG. 8. When the longitudinal risk potential RPlongitudinal reaches a predetermined value RPmax or greater, the accelerator pedal reaction force control command value FA becomes fixed to a maximum value FAmax to generate the maximum accelerator pedal reaction force.

Figure 9:
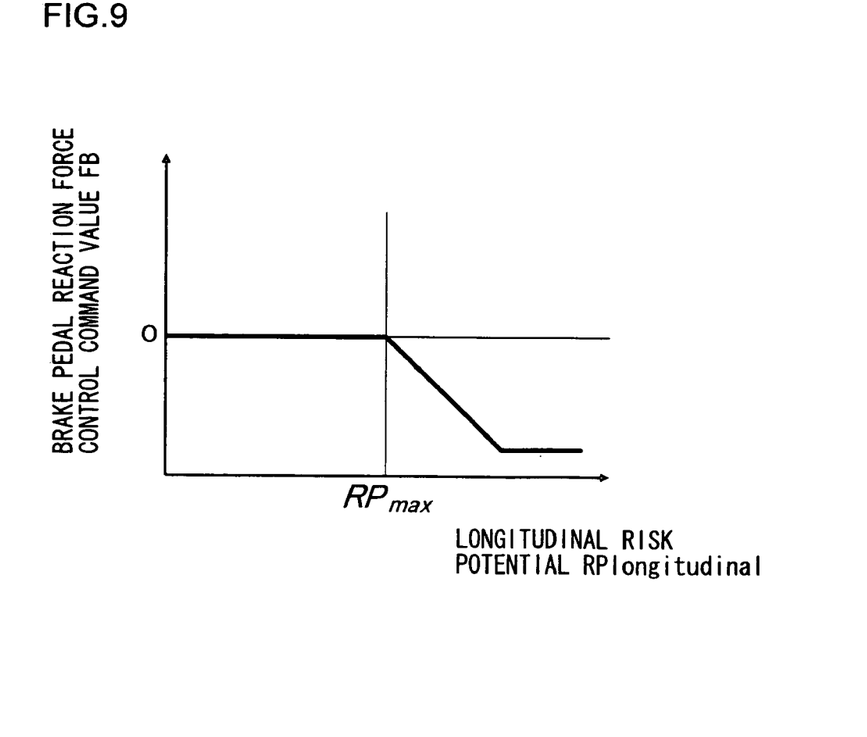
FIG. 9 is a figure showing the characteristic of the brake pedal reaction force command value with respect to the longitudinal risk potential.

FIG. 9 shows a relationship between the longitudinal risk potential RPlongitudinal and the brake pedal reaction force control command value FB. As shown in FIG. 9, the brake pedal reaction force control value FB becomes smaller as the longitudinal risk potential RPlongitudinal increases in a range equal to or greater than the predetermined value RPmax so that the brake pedal reaction force becomes smaller and the brake assist force becomes greater.

It is to be noted that if a negative judgment is made in step S170 or S270, the longitudinal reaction force control is not performed. Thus, the normal reaction forces corresponding to operation amounts are generated at the accelerator pedal 82 and the brake pedal 92.

In step S320, a lateral control command value, i.e., a steering reaction force control command value FS to be output to the SF control device 60 is calculated based on the lateral risk potential RPlateral calculated in step S160 or S260. The steering reaction force control command value FS is calculated in accordance with the lateral risk potential RPlateral so that a greater steering reaction force is generated in a direction for the subject vehicle to avoid a risk, i.e., in a direction to which the steering angle STR is put back as the RPlateral increases.

Figure 10:
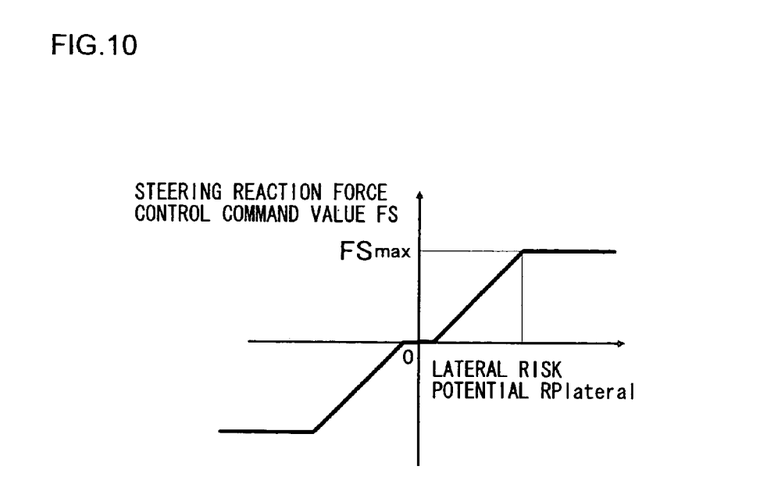
FIG. 10 is a figure showing the characteristic of the steering reaction force command value with respect to the lateral risk potential.

FIG. 10 shows a relationship between the lateral risk potential RPlateral and the steering reaction force control command value FS. An absolute value of the steering reaction force control command value FS becomes greater as an absolute value of the lateral risk potential RPlateral becomes greater, which means the steering reaction force in a direction to return the steering wheel 62 and to avoid a risk increases.

It is to be noted that in FIG. 10 the lateral risk potential RPlateral to the obstacle that exists on the right obstacle detection direction is shown in the positive area and the lateral risk potential RPlateral to the obstacle that exists on the left obstacle detection direction is shown in the minus area.

In step S330, the longitudinal control command values FA and FB calculated in step S310 are output to the AF control device 80 and the BF control value 90, respectively, and the lateral control command value FS calculated in step S320 is output to the SF control device 60. The AF control device 80 controls the servo motor 81 so as to generate the operation reaction force in the accelerator pedal 82, which is obtained by adding the reaction force control command value FA input from the controller 50 to the normal reaction force characteristic. The BF control device 90 controls the brake booster 91 so as to generate the operation reaction force in the brake pedal 92, which is obtained by adding the reaction force control command value FB to the normal reaction force characteristic. The SF control device 60 controls the steering reaction force in accordance with the reaction force command value FS. The processing for this time then terminates.

Figure 11:
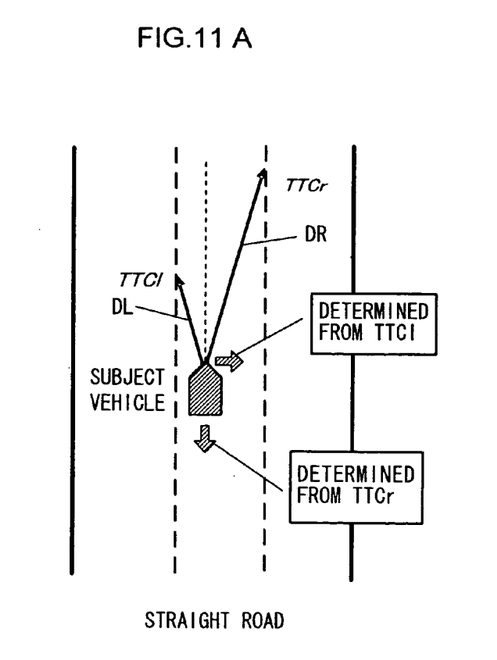
FIGS. 11A and 11B are figures for illustrating the operation of the first embodiment.

FIGS. 11A and 11B show figures for illustrating operations of the first embodiment. FIG. 11A shows a state where the subject vehicle travels on a straight road, and FIG. 11B shows a state where the subject vehicle travels on a curved road.

In the running situation shown in FIG. 11A, the subject vehicle goes straight in a left region of the vehicle lane. The central angle θ is 0 because the traveling direction of the subject vehicle is approximately towards the front of the vehicle, namely, the traveling direction is substantially parallel to the longitudinal centerline of the subject vehicle. And the opening angle α is set to α° to each side of the longitudinal centerline. On the two obstacle detection directions which are set by the central angle θ and the opening angle α, lane lines on the right side and the left side of the subject vehicle are present, respectively. Accordingly, the controller 50 calculates the time to contact TTCr and TTCl to each lane line. In FIG. 11A, lengths of arrows DR and DL each represent the level of TTCr and TTCl.

Since the subject vehicle travels in a left region of the vehicle lane as shown in FIG. 11A, the time to contact TTCl to the left lane line is smaller than the time to contact TTCr to the right lane line. Accordingly, the controller 50 calculates the lateral risk potential RPlateral based on the left time to contact TTCl, and controls the steering reaction force according to the lateral risk potential RPlateral. In addition, if the right time to contact TTCr is smaller than the predetermined value T0, the controller 50 calculates the longitudinal risk potential RPlongitudinal based on the time to contact TTCr. Then, the accelerator pedal reation force control and the brake pedal reation force control are performed according to the longitudinal risk potential RPlongitudinal. As a result, the steering reaction force corresponding to the left lane line is generated, and the accelerator pedal reaction force and the brake pedal reaction force corresponding to the right lane line are also generated.

In this manner, the operation reaction forces, which achieves an appropriate balance between the longitudinal direction and the lateral direction are generated so as to prompt the drive operation of the driver to an appropriate direction. In the running situation shown in FIG. 11A, since the right time to contact TTCr is relatively large, the reaction force control quantities in the longitudinal direction of the subject vehicle are not set to be significant. Therefore, the accelerator pedal operation or the brake pedal operation by the driver is not disturbed even when the reaction force control is performed.

In the running situation shown in FIG. 11B, the subject vehicle is likely to deviate from the vehicle lane while traveling on a curved road. The central angle θ is 0 because the traveling direction of the subject vehicle is approximately towards the front of the vehicle, namely, the traveling direction is substantially parallel to the longitudinal centerline of the subject vehicle. And the opening angle α is set to α° to each side of the longitudinal centerline. On the two obstacle detection directions which are set by the central angle θ and the opening angle α, lane lines on the right side and the left side of the subject vehicle are present, respectively. Accordingly, the controller 50 calculates the time to contact TTCr and TTCl to each lane line. In FIG. 11B, lengths of arrows DR and DL each represent the level of TTCr and TTCl.

Because the subject vehicle is likely to deviate from a right curve to the left as shown in FIG. 11B, the left time to contact TTCl is smaller than the right time to contact TTCr. Accordingly, the controller 50 calculates the lateral risk potential RPlateral based on the left time to contact TTCl, and controls the steering reaction force according to the lateral risk potential RPlateral. In addition, if the right time to contact TTCr is smaller than the predetermined value T0, the controller 50 calculates the longitudinal risk potential RPlongitudinal based on the time to contact TTCr. Then, the accelerator pedal reaction force control and the brake pedal reaction force control are performed according to the longitudinal risk potential RPlongitudinal.

In this manner, the steering reaction force corresponding to the lane line at the left which is closer to the subject vehicle is generated, and the accelerator pedal reaction force and the brake pedal reaction force corresponding to the lane line at the right which is farther are generated.

As a result, the steering reaction force is generated in a direction to which the steering wheel 62 is returned when the subject vehicle may deviate from the curved road as shown in FIG. 11B, so as to lead the drive operation of the driver to an appropriate direction. At this time, when the right time to contact TTCr is relatively large, the reaction force control quantities are calculated to small values. Then, if the subject vehicle keeps traveling straight and approaches further with the lane line, the left time to contact TTCl and the right time to contact TTCr both become small and thus, the reaction force control quantities in the lateral direction and the longitudinal direction of the subject vehicle become greater. As a result, the steering reaction force is generated so as to prevent the subject vehicle from deviating from the curve and also the reaction forces are generated to prompt the driver's deceleration operation. In this manner, the reaction forces are controlled while an appropriate balance is achieved in the reaction force controls in the longitudinal direction and the lateral direction.

In this way, with the first embodiment as explained above, the following advantage can be achieved.

(1) The controller 50 detects an obstacle that exists on each of the two obstacle detection directions with respect to the subject vehicle, and calculates the time to contact TTC to each of the obstacles. And, the lateral risk potential RPlateral is calculated based on a first time to contact which is smaller in the values of calculated time to contact and then, the reaction force control in the lateral direction of the subject vehicle is performed. Moreover, the longitudinal risk potential RPlongitudinal is calculated based on a second time to contact which is larger, and the reaction force in the longitudinal direction of the subject vehicle is controlled. In this manner, reaction force controls in the longitudinal and lateral direction of the subject vehicle can be combined, while an appropriate balance is achieved in the longitudinal reaction force control and the lateral reaction force control. In addition, it makes possible for the driver to easily understand which obstacle in the vehicle surroundings is taken as a target of the reaction force control.

(2) The controller 50 controls the reaction force in the longitudinal direction of the subject vehicle when the second time to contact which is larger is smaller than the predetermined value T0. Accordingly, it is possible to prompt the driver to start deceleration operation and to lead his drive operation to an appropriate direction, along with performing the steering reaction force control to return the steering angle so as to avoid a risk when a degree of closeness between the subject vehicle and the obstacle is substantial (3) The controller 50 sets two directions for detecting obstacles forward of the subject vehicle according to the traveling state of the subject vehicle. Thus, obstacles that may disturb the traveling of the subject vehicle are detected and the operation reaction force controls can be performed in correspondence with the driving conditions.

(4) The controller 50 sets an angle formed between the two obstacle detection directions, in other words, an opening angle α with respect to the traveling direction of the subject vehicle according to the subject vehicle speed V. In this manner, since the two obstacle detection directions are set according to the traveling direction of the subject vehicle which can be estimated from the subject vehicle speed V, obstacles that may hinder the traveling of the subject vehicle can be reliably detected.

(5) The controller 50 estimates an approximate traveling direction of the subject vehicle based on the subject vehicle speed V and the steering angle STR, and sets the central line, i.e., the central angle θ between the two obstacle detection directions according to the traveling direction. In this manner, the obstacle detection directions for detecting obstacles to the traveling of the subject vehicle can be set appropriately. It is to be noted that while the central angle θ was set based on both the subject vehicle speed V and the steering angle STR in the above described embodiment, it is also possible to set the central angle θ based on either the subject vehicle speed V or the steering angle STR. However, the traveling direction of the subject vehicle can be estimated more accurately by using both the subject vehicle speed V and the steering angle STR.

(6) Since the two obstacle detection directions are set forward of the subject vehicle, obstacles to the traveling of the subject vehicle can be detected reliably.

Second Embodiment

Next, a vehicle driving assist system according a second embodiment of the present invention will be described. The structure of the vehicle driving assist system of the second embodiment is identical to that of the first embodiment. Here, explanation will focus on points that differentiate the second embodiment from the first embodiment.

In the second embodiment, obstacles that exist on the two obstacle detection directions forward of the subject vehicle are detected as described in the first embodiment. The reaction force controls in the lateral and longitudinal direction of the subject vehicle are then performed in accordance with the time to contact TTCr and TTCl to each obstacle. In the second embodiment, the reaction force control in the longitudinal direction of the subject vehicle is performed only when the same obstacle is detected in both the right obstacle detection direction and the left obstacle detection direction.

Figure 12:
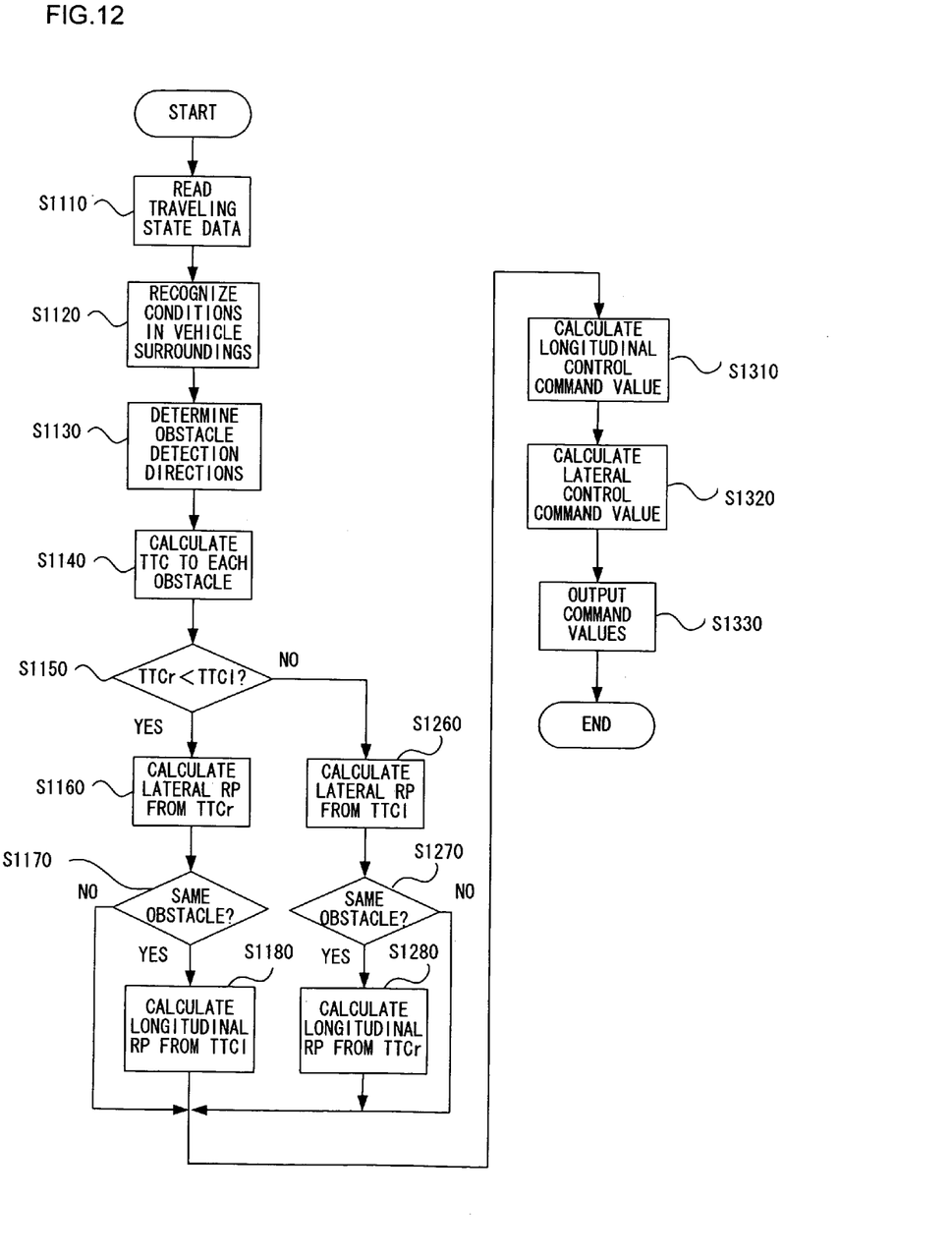
FIG. 12 is a flow chart showing the procedural flow of a drive operation assist control program executed in the second embodiment.

Explanations will be given as to how reaction force control quantities, i.e., reaction force control command values for performing the steering reaction force control, the accelerator pedal reaction force control, and the brake pedal reaction force control are determined in the second embodiment referring to FIG. 12. FIG. 12 is a flow chart showing the procedural flow of a drive operation assist control program executed in the controller 50 in the second embodiment. These processing procedures are executed continuously at predetermined time intervals of, e.g., 50 msec.

—Processing Flow in the Controller 50 (FIG. 12)—

The processing in steps S1110 to S1160 are identical to the processing in step S110 to S160 which are explained referring to the flow chart of FIG. 3 in the first embodiment, thus their explanations are omitted herein. After a risk potential RPlateral in the lateral direction of the subject vehicle is calculated based on the time to contact TTCr to the right which is smaller, the processing proceeds to step S1170.

Figure 13A:
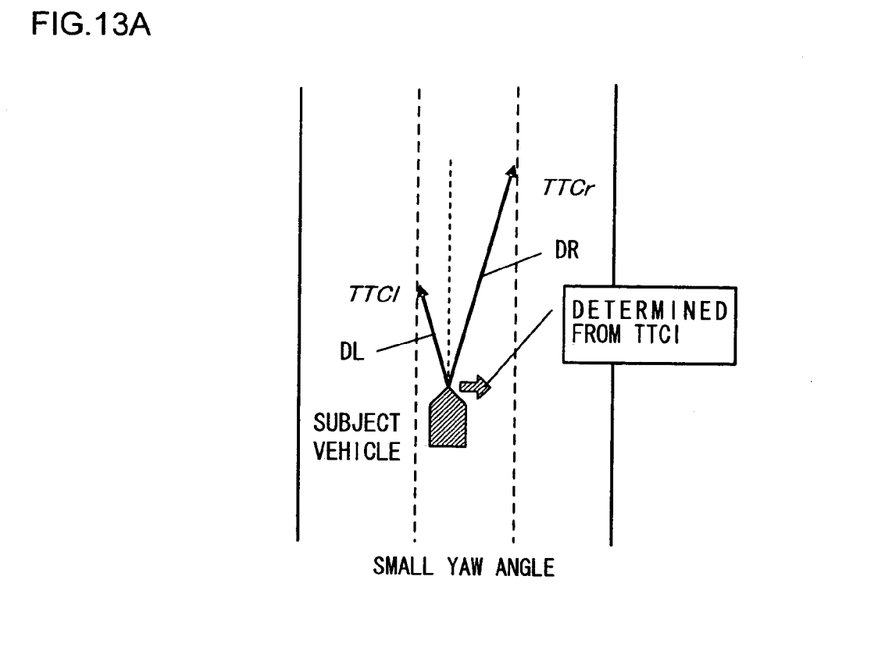
FIGS. 13A and 13B are figures for illustrating the operation of the second embodiment.
Figure 13B:
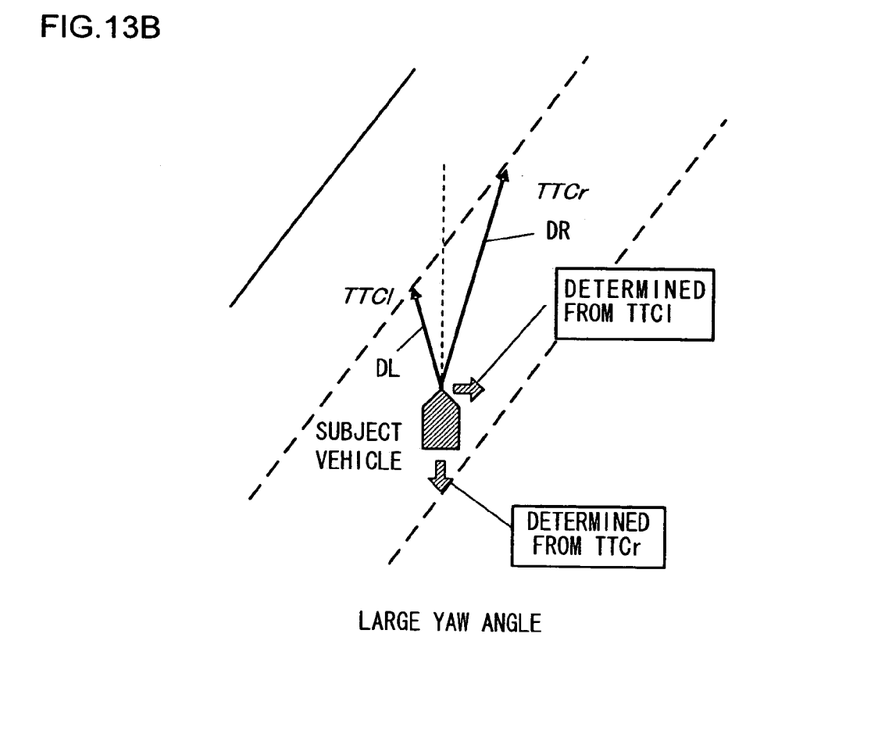

In step S1170, it is determined as to whether or not obstacles on the right and left obstacle detection directions are the same. For instance, when the same lane line is present on both the right and left obstacle detection directions as shown in FIG. 13B, step S1180 is proceeded to. In step S1180, a risk potential RPlongitudinal in the longitudinal direction of the subject vehicle is calculated based on the time to contact TTCl to the left which is greater. Here, as described in the first embodiment, the longitudinal risk potential RPlongitudinal is calculated using the map shown in FIG. 7. On the other hand, lane lines present on the right and left obstacle detection directions are different as shown in FIG. 13A, the longitudinal risk potential RPlongitudinal is not calculated. It may be determined as to whether or not obstacles on the right and left obstacle detection directions are the same by applying image processing to the detected image from the front camera 20 and determining the type of the detected obstacle.

When it is determined in step S1150 that the time to contact TTCl to the left is equal to or smaller than the time to contact TTCr to the right, step S1260 is proceeded to. In step S1260, the lateral risk potential RPlateral is caluculated based on the time to contact TTCl to the left referring to FIG. 6. Next, in step S1270, It is determined as to whether or not obstacles on the right and left obstacle detection directions are the same. When the same obstacle is detected on both the right and left obstacle detection directions, step S1280 is proceeded to. In step S1280, the longitudinal risk potential RPlongitudinal is calculated based on the right time to contact TTCr referring to FIG. 7. On the other hand, when the obstacles detected on the right and left obstacle detection directions are different, the longitudinal risk potential RPlongitudinal is not calculated.

The processing in the following steps S1310 to S1330 are identical to the processing in steps S310 to S330 shown in the flow chart of FIG. 3, thus their explanations are omitted.

Operations of the second embodiment will be explained hereinafter, referring to FIGS. 13A and 13B. FIG. 13A shows a state where the subject vehicle travels on a straight road at a small yaw angle, and FIG. 11B shows a state where the subject vehicle is likely to deviate from a straight road at a large yaw angle.

In the running situation shown in FIG. 13A, the subject vehicle goes straight in a left region of the vehicle lane. The central angle θ is 0 because the traveling direction of the subject vehicle is approximately towards the front of the vehicle, namely, the traveling direction is substantially parallel to the longitudinal centerline of the subject vehicle. And the opening angle α is set to α° to each side of the longitudinal centerline. On the two obstacle detection directions which are set by the central angle θ and the opening angle α, a lane lines at the right side of the subject vehicle and a lane line at the left side of the subject vehicle are present, respectively. The controller 50 calculates the time to contact TTCr and TTCl to each lane line. In FIG. 13A, lengths of arrows DR and DL each represent the level of TTCr and TTCl.

The controller 50 calculates the lateral risk potential RPlateral based on the left time to contact TTCl which is smaller in the right and left time to contact TTCr and TTCl. The steering reaction force is then controlled according to the lateral risk potential RPlateral. In this case as shown in FIG. 13A, obstacles detected in the right and left obstacle detection directions are not the same. Thus, the longitudinal risk potential RPlongitudinal is not calculated and the longitudinal reaction force control is not performed. As described above, when a different obstacle is detected in each of the right and left obstacle detection directions, only the lateral reaction force control is performed.

In a situation where the yaw angle of the subject vehicle is large and the subject vehicle is likely to deviate from the vehicle lane as shown in FIG. 13B, the same lane line is detected in both the two obstacle detection directions. Accordingly, the controller 50 calculates the lateral risk potential RPlateral based on the left time to contact TTCl which is smaller, and controls the steering reaction force according to the lateral risk potential RPlateral. In addition, the longitudinal risk potential RPlongitudinal is calculated based on the right time to contact TTCr which is larger, and the accelerator pedal reaction force control and the brake pedal reaction force control are performed according to the longitudinal risk potential RPlongitudinal thus calculated.

In this manner, the lateral reaction force control and the longitudinal reaction force control for the subject vehicle are performed so as to lead the driver's steering operation to an appropriate direction and so as to prompt the driver's deceleration operation when the subject vehicle is likely to deviate from the vehicle lane. If the subject vehicle approaches the lane line further than the situation shown in FIG. 13B, the reaction force control quantities in the longitudinal direction and the lateral direction increases so as to urge the driver to perform the drive operation to avoid the deviation from the vehicle lane.

In this way, with the second embodiment as explained above, the following advantage can be achieved.

The controller 50 determines the type of the obstacle that exists on each of the two obstacle detection directions and performs the reaction force control in the longitudinal direction of the subject vehicle when the obstacles on the two directions are the same, in addition to the lateral reaction force control. Accordingly, it is possible to lead driver's operation to an appropriate direction by prompting the driver's deceleration operation and leading the steering operation to an appropriate direction when the subject vehicle is likely to deviate from the vehicle lane as shown in FIG. 13B. The reaction force control in the longitudinal direction of the subject vehicle is not performed when the different obstacles are present in the two obstacle detection directions. Thus, for instance, even when the width of the vehicle lane narrows, causing the time to contact TTCr and TTCl to decrease while the lane lines at the right and the left of the subject vehicle are detected in the right and left obstacle detection directions, the driver's operation is not disturbed due to increase in the accelerator pedal reaction force.

In the first and second embodiments described above, explanations are given by way of example in a case where lane lines are present in the obstacle detection directions. However, the longitudinal and lateral reaction force controls are performed in the same manner as the above described embodiments when obstacles other than lane lines, such as other vehicles are present in the obstacle detection directions. In such a case, it is possible to weight the time to contact of the subject vehicle according to the type of the detected obstacle.

In the above described first and second embodiments, it is arranged that control upon the operation of the subject vehicle in the longitudinal direction of the subject vehicle is performed by means of the accelerator pedal reaction force control device 80 and the brake pedal reaction force control device 90. In other words, the accelerator pedal 82 and the brake pedal 92 are used as vehicle operation equipments for drive operation in the longitudinal direction. However, the present invention is not to be limited to this structure, and it is acceptable to utilize, for instance, only one of the reaction force control devices 80 and 90 to control the reaction force in the longitudinal direction. In the above described first and second embodiments, the brake assist force is generated by using the negative pressure of an engine at the brake booster 91, but the present invention is not to be limited to this structure. The brake assist force may instead be generated by using hydraulic power which is controlled by a computer.

In the above first and second embodiments, the steering wheel 62 is used by way of example as an vehicle operation equipment for drive operation in the lateral direction.

The vehicle to which the vehicle driving assist system of the present invention is mounted is not to be limited to the structure shown in FIG. 2.

While the laser radar 10 and the front camera 20 are utilized as a means for detecting an obstacle in the vehicle surroundings in the above described first and second embodiment, the present invention is not to be limited to this structure. For instance, a millimeter wave radar, a magnetic nail or Differential GPS system, etc. can instead be used as a means for detecting an obstacle. A device that performs image processing upon the image signal from the front camera 20 may be installed independently of the controller 50.

The above-described embodiments are examples, and various modifications can be made without departing from the spirit and scope of the invention.

The disclosure of the following priority application is herein incorporated by reference:

Japanese Patent Application No. 2003-159296 filed Jun. 4, 2003

What is claimed is:

1. A vehicle driving assist system, comprising:
   an obstacle detection device that detects an obstacle present in each of two obstacle detection directions with respect to a subject vehicle;
   a TTC calculation device that calculates a TTC between the subject vehicle and each of the obstacles, that is a time to contact that expresses a length of time until the subject vehicle and the obstacle come to mutual contact, based on detection results of the obstacle detection device;
   a lateral reaction force control device that controls a reaction force generated at a first vehicle operation equipment for drive operation in a lateral direction of the subject vehicle based on a first TTC which is smaller in the TTCs calculated in the TTC calculation device; and
   a longitudinal reaction force control device that controls a reaction force generated at a second vehicle operation equipment for drive operation in a longitudinal direction of the subject vehicle based on a second TTC which is larger in the TTCs calculated in the TTC calculation device.

2. A vehicle driving assist system according to claim 1, wherein:
the longitudinal reaction force control device executes control on the reaction force in the longitudinal direction when the second TTC is smaller than a predetermined value.

3. A vehicle driving assist system according to claim 1, further comprising:
an obstacle type determination device that determines a type of obstacle detected by the obstacle detection device, wherein
the longitudinal reaction force control device executes control on the reaction force in the longitudinal direction when the obstacle type determination device determines that a same obstacle is present in the two obstacle detection directions.

4. A vehicle driving assist system according to claim 1, further comprising:
a traveling state detection device that detects a traveling state of the subject vehicle, and
a direction setting device that sets the obstacle detection directions according to detection results of the traveling state detection device.

5. A vehicle driving assist system according to claim 4, wherein:
the direction setting device determines an angle formed between the two obstacle detection directions according to a subject vehicle speed detected by the traveling state detection device.

6. A vehicle driving assist system according to claim 4, wherein:
the direction setting device determines a central line between the two obstacle detection directions according to at least one of a subject vehicle speed and a steering angle detected by the traveling state detection device.

7. A vehicle driving assist system according to claim 4, wherein:
the direction setting device sets the two obstacle detection directions in a forward region of the subject vehicle.

8. A vehicle driving assist system according to claim 1, wherein:
the first vehicle operation equipment for drive operation in the lateral direction is a steering wheel, and
the second vehicle operation equipment for drive operation in the longitudinal direction is at least one of an accelerator pedal and a brake pedal.

9. A vehicle, comprising:
a vehicle driving assist system that comprises (a) an obstacle detection device that detects an obstacle present in each of two obstacle detection directions with respect to a subject vehicle; (b) a TTC calculation device that calculates a TTC between the subject vehicle and each of the obstacles, that is a time to contact that expresses a length of time until the subject vehicle and the obstacle come to mutual contact, based on detection results of the obstacle detection device; (c) a lateral reaction force control device that controls a reaction force generated at a first vehicle operation equipment for drive operation in a lateral direction of the subject vehicle based on a first TTC which is smaller in the TTCs calculated in the TTC calculation device; and (d) a longitudinal reaction force control device that controls a reaction force generated at a second vehicle operation equipment for drive operation in a longitudinal direction of the subject vehicle based on a second TTC which is larger in the TTCs calculated in the TTC calculation device.

10. A vehicle driving assist system, comprising:
an obstacle detection means for detecting an obstacle present in each of two obstacle detection directions with respect to a subject vehicle;
a TTC calculation means for calculating a TTC between the subject vehicle and each of the obstacles, that is a time to contact that expresses a length of time until the subject vehicle and the obstacle come to mutual contact, based on detection results of the obstacle detection means;
a lateral reaction force control means for controlling a reaction force generated at a first vehicle operation equipment for drive operation in a lateral direction of the subject vehicle based on a first TTC which is smaller in the TTCs calculated in the TTC calculation means; and
a longitudinal reaction force control means for controlling a reaction force generated at a second vehicle operation equipment for drive operation in a longitudinal direction of the subject vehicle based on a second TTC which is larger in the TTCs calculated in the TTC calculation means.

11. A vehicle driving assist method, comprising:
detecting an obstacle present in each of two obstacle detection directions with respect to a subject vehicle;
calculating a TTC between the subject vehicle and each of the obstacles, that is a time to contact that expresses a length of time until the subject vehicle and the obstacle come to mutual contact, based on information of the detected obstacle;
controlling a reaction force generated at a first vehicle operation equipment for drive operation in a lateral direction of the subject vehicle based on a first TTC which is smaller in the calculated TTCs; and
controlling a reaction force generated at a second vehicle operation equipment for drive operation in a longitudinal direction of the subject vehicle based on a second TTC which is larger in the calculated TTCs.

* * * * *